US012768789B2

(12) United States Patent
Reuss et al.

(10) Patent No.: US 12,768,789 B2
(45) Date of Patent: Oct. 20, 2026

(54) METHOD FOR LOCALIZING OR TRACKING EMITTERS

(71) Applicant: Abberior Instruments GmbH, Gottingen (DE)

(72) Inventors: Matthias Reuss, Gottingen (DE); Roman Schmidt, Gottingen (DE)

(73) Assignee: ABBERIOR INSTRUMENTS GMBH, Gottingen (DE)

( * ) Notice: Subject to any disclaimer, the term of this patent is extended or adjusted under 35 U.S.C. 154(b) by 327 days.

(21) Appl. No.: 18/776,563

(22) Filed: Jul. 18, 2024

(65) Prior Publication Data

US 2025/0027880 A1 Jan. 23, 2025

(30) Foreign Application Priority Data

Jul. 19, 2023 (DE) ..................... 10 2023 119 102.0

(51) Int. Cl.
*G01N 21/64* (2006.01)
*G02B 21/00* (2006.01)

(52) U.S. Cl.
CPC ..... *G01N 21/6458* (2013.01); *G02B 21/0032* (2013.01); *G02B 21/0072* (2013.01); *G02B 21/0076* (2013.01)

(58) Field of Classification Search
CPC ............ G01N 21/6458; G02B 21/0032; G02B 21/0072; G02B 21/0076; G02B 21/16
See application file for complete search history.

(56) References Cited

U.S. PATENT DOCUMENTS

| | | | | |
|---|---|---|---|---|
| 12,631,863 | B2 * | 5/2026 | Fischer | G01N 21/6458 |
| 12,644,838 | B2 * | 6/2026 | Schmidt | G01N 21/6458 |

(Continued)

FOREIGN PATENT DOCUMENTS

| | | |
|---|---|---|
| DE | 10 2013 114 860 B3 | 5/2015 |
| DE | 10 2011 055 367 B4 | 2/2017 |

(Continued)

OTHER PUBLICATIONS

Marcus Oliver Held, Dissertation, 4Pi-MINFLUX localizations of fluorescent molecules (PhD Thesis), submitted to the Combined Faculties for the Natural Sciences and for Mathematicsof the Ruperto-Carola University of Heidelberg, Germany,for the degree of Doctor of Natural Sciences, 2021, 21 pages, https://doi.org/10.11588/heidok.00030257.

(Continued)

*Primary Examiner* — Seung C Sohn
(74) *Attorney, Agent, or Firm* — MOSER TABOADA

(57) ABSTRACT

The disclosure relates to a method and a microscope for localizing and tracking singulated emitters in a sample. A sample is exposed to an intensity distribution of an illumination light comprising a local intensity minimum in a close region of the singulated emitter. The position of the intensity distribution in the sample fluctuates around a nominal position. The sample is excited to emit and the emissions are detected. Measured variables are recorded in such a way that the current positions of the intensity distribution in the sample can be assigned to the detected emissions. A position of the emitter can be estimated from the detected emissions and the assigned current positions of the intensity distribution.

20 Claims, 4 Drawing Sheets

(56) References Cited

U.S. PATENT DOCUMENTS

| | | | |
|---|---|---|---|
| 2009/0289042 | A1 | 11/2009 | Ueda |
| 2023/0003651 | A1 | 1/2023 | Harke et al. |

FOREIGN PATENT DOCUMENTS

| | | | |
|---|---|---|---|
| DE | 10 2022 119 589 | B3 | 11/2023 |
| DE | 10 2022 119 304 | A1 | 2/2024 |
| EP | 3 372 990 | B1 | 3/2021 |
| EP | 3 951 470 | A1 | 2/2022 |
| EP | 4 246 202 | A1 | 9/2023 |
| EP | 4 246 203 | A1 | 9/2023 |
| WO | WO 2010069987 | A1 | 6/2010 |
| WO | WO 2018069283 | A1 | 4/2018 |
| WO | WO 2021/122407 | A1 | 6/2021 |
| WO | WO 2023166065 | A1 | 9/2023 |

OTHER PUBLICATIONS

Balzarotti et al. "Nanometer resolution imaging and tracking of fluorescent molecules with minimal photon fluxes." Science (New York, N.Y.) (2017), pp. 1-7 and pp. 1-72, vol. 355,6325 doi:10.1126/science.aak9913.

Gwosch et al. "MINFLUX nanoscopy delivers 3D multicolor nanometer resolution in cells." Nature methods (2020): pp. 1-33, vol. 17,2, doi:10.1038/s41592-019-0688-0.

Wirth et al. "MINFLUX dissects the unimpeded walking of kinesin-1." Science (New York, N.Y.) (2023): 1004-1010, pp. 1-7, vol. 379,6636, doi:10.1126/science.ade2650.

* cited by examiner

METHOD FOR LOCALIZING OR TRACKING EMITTERS

CROSS-REFERENCE TO RELATED APPLICATIONS

This present application claims the benefit of and priority to DE Patent Application Serial No. 10 2023 119 102.0, filed Jul. 19, 2023, the entire contents of which is incorporated herein by reference.

TECHNICAL FIELD

The present disclosure is directed to a method and a microscope for the localization and tracking of singulated emitters in a sample according to the MINFLUX or STED-MINFLUX principle. Compared to the MINFLUX and STED-MINFLUX microscopy methods known from the prior art, the disclosure is characterized by highly relaxed requirements for the beam positioning device with which the illumination light is positioned in the sample.

PRIOR ART

MINFLUX nanoscopy is a microscopy technique that is still in its infancy. MINFLUX nanoscopy is a method of localization microscopy. The localization of individual particles, in particular individual fluorophores, is carried out by means of structured illumination light distributions, wherein the illumination light is scattered on the particles or wherein the illumination light excites them to luminescence, in particular to fluorescence, and in such a general sense is an excitation light. The basic special feature of MINFLUX nanoscopy is that the illumination of the particles, in particular the excitation of the fluorophore, is carried out in such a way that a particle to be localized or a particle whose movement is to be tracked in a sample is placed at different positions close to or at a minimum of the excitation light distribution, which is ideally a zero point, the excitation light distribution comprising an intensity increase area adjacent to the minimum. This ensures that the photons scattered on the particle or the fluorescence photons contain a particularly large amount of information about the current position of the respective particle. This applies in particular to applications in which the movement of fluorophores is to be tracked over time. To obtain this information, the light emitted from the region of the minimum is detected. The tracking of a single particle using an excitation minimum is known, for example, from patent DE 10 2011 055 367 B4, the localization of a single fluorescent molecule using an intensity distribution of excitation light with a local intensity minimum from German patent DE 10 2013 114 860 B3.

On this basis, a number of refinements have been made to obtain information that enable localization of the fluorophores with an uncertainty in the range below 2 nm and tracking of the movement of singulated fluorophores both within a range of a few nanometers and within a range of a few micrometers. A detailed but not exhaustive description of MINFLUX nanoscopy can be found in F. Balzarotti et al, “Nanometer resolution imaging and tracking of fluorescent molecules with minimal photon fluxes”, *Science* 355, 606-612 (2017), DOI: 10.1126/science.aak9913. Experiments show a non-iterative MINFLUX localization as well as a tracking of singulated fluorophores using MINFLUX. In addition, the concept of iterative MINFLUX is presented. Basically, in order to localize a fluorophore using MINFLUX nanoscopy, the intensity minimum or intensity zero is placed at a number of positions relative to the position of the fluorophore.

To this end, in a preparatory step, a current position of the fluorophore is estimated with a first, lower accuracy or determined in an alternative way. This can be done for example by means of conventional localization microscopy (PALM, STORM) or by means of other known methods from the prior art. Subsequently, an intensity distribution of excitation light with a central minimum, for example in the form of a donut as known from STED microscopy, is placed at a known position that is selected in such a way that the estimated position of the fluorophore is close to the minimum of the intensity distribution. The fluorescence response of the fluorophore is measured. The same is usually done for several other positions of the intensity distribution placed around the estimated position and, if necessary, also for the position corresponding to the estimated position. The plurality of such scanning positions forms a set of scanning positions. By means of a ratiometric evaluation of the intensities measured at the scanning positions, the position of the fluorophore is determined with greater accuracy. This more precisely determined position can now be used as the starting position for a repetition of the sequence of the aforementioned steps, wherein the positions of the minimum of the intensity distribution of excitation light can be placed closer to the estimated position of the fluorophore in the case of localization of a particle. This method can be continued iteratively. This method can also be carried out for different spatial directions in a temporal sequence, in particular alternately, so that, for example, the position of the particle is determined in a spatial direction with a first intensity distribution with a minimum extending in a first direction and the position of the particle is determined in a second spatial direction with a second intensity distribution with a minimum extending in a second direction which is oriented perpendicular to the first direction.

If the movement of a particle is to be tracked, it may be useful not to reduce the distance of the positions at which the intensity minimum is placed from the position estimated in the previous step from step to step. The method is carried out in accordance with the description in the above-mentioned publication by means of a microscope which contains both a piezo scanner and electro-optical deflectors (EOD). An image field of approximately 20 μm×20 μm can be addressed using this combined scanning device. Using the EOD alone, an image field of approximately 2 μm×2 μm can be addressed, wherein high-speed displacement is only possible in a field of approximately 300 nm×300 nm. Both when performing a localization and when tracking a particle, the scanning positions of a set of scanning positions are exclusively controlled using high-speed EOD scanning. A combination of piezo scanner and EOD can then be used to relocate the center. The movement of singulated molecules that are only mobile in a narrowly defined area, namely in an area covered by a set of scanning positions, can be carried out using a fixed set of scanning points.

Various embodiments of MINFLUX methods are described in the international publication WO 2018/069283 A1. Among other things, a method is described in which the scanning positions of a set of scanning points around an initial spatial range are scanned quasi-simultaneously. The positions of the zero point, i.e. the scanning points, are then successively shifted into the initial spatial range depending on the photons of luminescence light registered at each of the positions. In extreme cases, a shift into the initial location range can already occur if a single photon is registered at a scanning position.

The European patent specification EP 3 372 990 B1 discloses a method in which a set or sets of scanning positions are scanned with a local zero of an intensity distribution of fluorescence inhibition light which is superimposed with, for example, a Gaussian-shaped intensity distribution of excitation light. The position of the fluorophore can then be determined in basically the same way as in MINFLUX methods, wherein the dependence of the fluorescence intensity on the distance of the fluorophore with respect to the zero point of the intensity distribution of the fluorescence inhibition light differs from MINFLUX in that the fluorescence intensity or the rate at which photons can be detected decreases with increasing distance. Such methods are hereinafter referred to in this application as STED-MINFLUX methods.

In Klaus C. Gwosch et al, "MINFLUX nanoscopy delivers 3D multicolor nanometer resolution in cells", *Nat. Methods* 17, 217-224 (2020), DOI: 10.1038/s41592-019-0688-0 and the accompanying "Supplementary Information", a concrete realization of a three-dimensional localization using MINFLUX is described. For this purpose, a 3D donut, i.e. an intensity distribution with a local minimum surrounded by intensity increase areas in all three spatial directions, is used, which is placed at scanning positions of a three-dimensional set of scanning positions. A scanning device is used which, in addition to a piezo scanner and EODs, comprises a lens with an adjustable focal length. A static calibration is performed for the scanning device so that an exact correlation between the control voltages of the components and the actual scanning positions of the sample is known. The calibration data is used to precisely address the scanning positions in the sample.

The MINFLUX implementations described in the prior art, insofar as they are based on a displacement of an intensity distribution, have in common that the (fluorescence) emission of the particles to be localized is registered at predetermined, defined scanning positions. This means that the position of the illumination light in the sample represents a parameter of the measurement, while the (fluorescence) emission registered at this position is the measured variable. Since the dwell time at each scanning position is short (in the order of a few microseconds), this embodiment places high demands on the dynamic properties of the scanning device. In particular, positioning times in the microsecond range can hardly be realized with mechanical beam positioning units or beam scanners alone. Even fast galvanometer scanners typically have step response times of 100 μs to 200 μs.

For this reason, the MINFLUX embodiments described in the above-mentioned prior art have so far regularly used scanning devices in which two scanners with complementary properties are combined with each other, e.g. galvanometer scanners based on tilting mirrors driven by a galvo motor, with which the beam can be positioned over larger image fields, are combined with electro-optical deflectors, with which a fast positioning of the illumination light at the scanning positions is performed. In the publication "MINFLUX dissects the unimpeded walking of kinesin-1" (Jan O. Wolff et al., *Science* 379, 1004-1010 (2023), DOI:10.1126/science.ade2650), an alternative concept for shifting an intensity distribution with a local minimum is described. Here, an intensity distribution with a respective minimum is generated by irradiating two mutually coherent light beams collimated into different parts of a pupil of an objective. The position of the respective minimum, which is extended in one spatial direction, and the intensity distribution adjacent to the minimum is now deterministically shifted for MINFLUX scanning by changing the phase relationship between the two incident partial beams. The corresponding device is referred to in the publication as a phase scanner. Larger displacements are achieved by a galvo scanner system and a positioning table.

Objective

It is now the objective of the present disclosure to provide a MINFLUX method or a STED-MINFLUX method which enables localization and/or tracking of singulated emitters in a sample with a high spatial and/or temporal resolution, in which the requirements on the beam positioning device are reduced.

Solution

This objective is attained by the subject matter of independent claims. Advantageous embodiments of the method and the MINFLUX microscope are given in the subclaims.

Definitions

In this application, emitters are understood to be objects which, when illuminated with excitation light, can be regarded as point light sources with regard to the measurements according to the disclosure. The light emitted by the object that acts as a point light source may, for example, be scattered light resulting from elastic scattering such as Rayleigh scattering or inelastic scattering such as Raman scattering, or it may be luminescence light, in particular fluorescence light. It is essential for an emitter that it emits light immediately or with a short time delay in response to illumination. If movements of the emitter are to be tracked, the maximum time delay is related to the temporal resolution with which the movements of the light-emitting particles or light-emitting units are to be tracked and to the speed at which the particles or units move in the sample. The time delays may be up to about 10 μs but are usually in the range up to a few tens of nanoseconds, often in the range of 1 to 10 ns and, if the emission is scattered light, zero. In this application, the term fluorescence emitter is used to designate emitters that act as fluorescence point light sources. Emitters may be, for example, metallic nanoparticles. The more specific term fluorescence emitter includes, for example, singulated fluorescent dye molecules or their fluorescent chemical groups. Instead of dyes, other fluorescent units such as quantum dots or up-converting nanoparticles may also be used for labeling. Accordingly, in the context of the application, excitation light is understood to mean not only fluorescence excitation light, but generally such light that causes light to be emitted from an emitter.

In the context of the application, an emitter is designated as singulated if a distance to a neighboring emitter from which it cannot be distinguished optically is at least as great as a distance corresponding to the resolution of the optical arrangement with which the emissions are detected when the method is carried out.

In this application, emission inhibition light is understood to mean light that prevents, reduces or completely suppresses the emission of an emitter. In particular, the emission inhibition light may be stimulation light or STED light that induces a stimulated emission of an electronically excited emitter, whereby the emitter is transferred (back) to the electronic ground state and thus prevented from spontaneous (fluorescence) emission. It is important to note that the illumination light modulates the fluorescence emission of the emitter depending on its intensity, wherein both an amplification of the emission (if the illumination light is excitation light) or an attenuation of the emission (if the scanning light is emission inhibition light) is possible. If the illumination light is not itself the excitation light, the emitter is additionally illuminated with a separate excitation light that stimulates the emitter to emit.

In this application, MINFLUX methods are understood to mean localization and tracking methods for singulated emitters in which light distributions of illumination light which excites light emissions of the emitter are generated at the focus in the sample, the light distributions comprising a local minimum, and in which the position of a singulated emitter is determined by detecting light emissions of the emitter for different positions of the minima of the relevant light distributions or for different such light distributions in a close region of the emitter, wherein the smaller the distance between the emitter and the minimum of the light distribution, the less light is emitted by the emitter.

A close region of an emitter is understood to be an area or a volume (for example a circle or a sphere) around a presumed position of a singulated emitter. Therein, the presumed position of the emitter may form a center of the area or volume. In particular, the close region comprises dimensions in the size range of the optical diffraction limit, i.e. further in particular the close region extends in one spatial direction (further in particular in two spatial directions or in three spatial directions) no further than a small multiple of the diffraction limit (at a given wavelength of detection of the light emitted by the emitter), further in particular ten times, further in particular five times, further in particular two times, further in particular 1.5 times, the diffraction limit. In particular, the close region does not extend further than the diffraction limit in at least one spatial direction. In particular, the diffraction limit may correspond to the diameter of an Airy disk. For example, in the case of a two-dimensional localization of the emitter, the close region may be a circle with a diameter in the range from 100 nm to 2 μm, in particular 150 nm to 2 μm, further in particular 200 nm to 2 μm, further in particular 250 nm to 2 μm, further in particular 300 nm to 2 μm. According to a further example, in the case of two-dimensional localization, the close region may be a circle with a diameter in the range from 100 nm to 2 μm, in particular 100 nm to 1.5 μm, further in particular 100 nm to 1 μm, further in particular 100 nm to 500 nm. Further examples are in particular circles with a diameter of 150 nm to 1.5 μm, 150 nm to 1.5 μm, 200 nm to 1.5 μm, 250 nm to 1.5 μm, 300 nm to 1.5 μm, 150 nm to 1 μm, 200 nm to 1 μm, 250 nm to 1 μm, 300 nm to 1 μm, 150 nm to 500 nm, 200 nm to 500 nm, 250 nm to 500 nm or 300 nm to 500 nm. The center of the circle is located in particular at the presumed position of the emitter. In the case of a three-dimensional localization, the close region may be a sphere with the above-mentioned diameters.

In this application, STED-MINFLUX methods are understood to be methods corresponding to MINFLUX methods as defined above, with the exception that an intensity distribution of emission inhibition light, which overlaps with excitation light, replaces the intensity distribution of excitation light. The fact that the intensity distribution of emission inhibition light overlaps with excitation light means that the sample in the area of the intensity minimum and the adjacent sections of the intensity increase areas of the emission inhibition light, within which an emitter is located, is exposed to excitation light in such a way, that an emission of the emitter is excited or would be excited in the absence of emission inhibition light, so that the emission inhibition light affects the excited emission or the excitation of the emission according to its intensity distribution in such a way, that a measured emission of an emitter located within the intensity distribution of the emission inhibition light decreases at increasing distance from the intensity minimum. If the emission inhibition light is STED light and the emitter is a fluorescence emitter, this means that the spontaneous emission of the fluorescence emitter decreases with increasing distance from the intensity minimum of the STED light. The stimulated emission of the emitter, which has the same wavelength as the STED light, does not contribute to the measured emission, as is usual in STED microscopy; for example, it is blocked by means of a filter. The fact that the intensity distribution of emission inhibition light overlaps with excitation light does not mean that the excitation under light and the emission inhibition light are introduced into the sample strictly simultaneously. For example, it is possible, as is usual in STED microscopy, that a short pulse of excitation light is applied immediately followed by a pulse of STED light as emission inhibition light. The excitation light with which the intensity distribution of emission inhibition light overlaps may, for example, comprise an intensity distribution as is common in confocal microscopy, i.e. it may correspond approximately to an Airy function or a Gaussian function, the central maximum of which may coincide with the minimum of the emission inhibition light. It may also correspond to a top hat function. Constant excitation in the wide field is also possible.

The term STED-MINFLUX is used in a generalized sense and should in no way be understood to mean that the emission inhibition light must be STED light.

In MINFLUX microscopy and STED-MINFLUX microscopy, the sample is illuminated with focused illumination light, wherein the illumination light forms an intensity distribution with a central intensity minimum, in particular an intensity zero, around a geometric focus in the sample. The position of a singulated emitter relative to the central minimum then determines the intensity or photon emission rate of the emitter's light emissions, which are used to localize the emitter. Intensity distributions with a central minimum can be generated in particular by phase modulation of the illumination light using a phase filter or a spatial light modulator (SLM) in the illumination beam path, focusing of the illumination light using an objective lens and, if necessary, additional circular polarization of the illumination light. The intensity distribution is then created at the geometric focus by interference.

In this application, a donut-shaped intensity distribution is understood to be a special form of intensity distribution with a central minimum, which comprises a minimum that is surrounded by intensity increase areas in all spatial directions within a given plane.

If this minimum extends along an axis perpendicular to this plane, this minimum is referred to in this application as a 2D minimum. A 2D minimum can be obtained, for example, by means of a vortex phase plate in the beam path, wherein the minimum may then extend along the optical axis of a objective, for example.

In this application, a 3D minimum is understood to be a minimum that is surrounded by intensity increase areas in all spatial directions. A 3D minimum can be obtained, for example, by means of a so-called annular phase plate or by superimposing two light beams, wherein the wavefront of one of the two is modulated in phase in a pupil by means of a so-called annular phase plate and that of the other by means of a vortex phase plate. A 3D minimum may also have a donut-shaped intensity distribution in a given plane.

In this application, the term localization describes a method in which the position of a singulated emitter in a sample is determined. In contrast to conventional light microscopy methods, no optical imaging of the sample is required. Rather, in the MINFLUX localization method according to the disclosure, light emissions of the emitter are detected for different positions of the intensity distribution of the illumination light and the position of the emitter is determined from these, for example calculated using a position estimator. This process may be carried out successively for several singulated emitters, and the determined positions of the emitters may be displayed in a localization map, which may produce a high-resolution light microscopic image.

The tracking of an emitter is understood to mean the determination of a trajectory of an emitter moving in the sample, in particular by successive multiple localizations over time.

In the context of the present application, a beam positioning device is a device that is configured to displace an intensity distribution of an illumination light in a sample and a sample relative to each other. As a result, viewed from the reference system of the sample, a beam positioning device displaces an intensity distribution of the illumination light in the sample. The term beam positioning device includes in particular beam scanners, phase scanners, as known from the above-mentioned publication "MINFLUX dissects the unimpeded walking of kinesin-1", and positioning tables.

In the context of the present application, a light displacement unit is a device which is configured to displace an intensity distribution of an illumination light in a sample by acting on the illumination light, for example by deflection, in a sample while the sample remains in a rest position.

In the context of the present application, a beam scanner is a device which is configured to shift a beam of illumination light, i.e. an illumination light beam, by means of an optical component or by means of several optical components, so that the focus of the illumination light on or in the sample is shifted in at least one spatial direction. In particular, the focus may be shifted in two spatial directions, in particular in a focal plane that is perpendicular to an optical axis of an objective. The spatial directions may be defined in various coordinate systems, e.g. in Cartesian coordinates (e.g. x and y direction), in polar coordinates or in spherical coordinates (e.g. radial and azimuthal direction). The beam scanner may, for example, comprise mechanical scanners, in particular scanners based on tilting mirrors each connected to a galvo motor, electro-optical deflectors or acousto-optical deflectors.

In the context of this application, a galvo scanner is understood to be a module with a galvo motor and a tilting mirror connected to it and movable by the galvo motor. A galvo scanner may additionally comprise elements other than the galvo motor and tilting mirror.

In the context of this application, a galvo scanner system is defined as a scanning unit comprising one or more galvo scanners, which as a whole is set up to displace and/or deflect a light beam in one or more spatial directions.

In the context of the present application, a mechanical scanner is a scanner that variably deflects an illumination light, with the deflection being varied by moving at least one optical component, e.g. a mirror. In particular, the movement can be a rotation, particularly a tilting, about one or more axes of rotation. Accordingly, both a galvo scanner or a galvo scanner system and a micro-electromechanically actuated scanner, i.e. a MEMS scanner, are mechanical scanners within the meaning of this application. Similarly, a scanner based on rotatable Risley prisms is a mechanical scanner within the meaning of this application.

The beam scanner may receive control signals, in particular electrical signals, from a control device, which influence a state of the at least one optical component in order to move the illumination light beam to a desired position. If the beam scanner is a mechanical scanner with at least one movable optical component, the control signals are then assigned to nominal positions or nominal movements of the at least one optical component, which are determined by the control signals.

DESCRIPTION

A first aspect of the disclosure relates to a method for localizing or tracking a singulated emitter in a sample by means of a MINFLUX method or a STED-MINFLUX method, by which the position of the singulated emitter in a sample is determined and/or the position of the emitter is tracked in time.

For this purpose, an intensity distribution of an illumination light with a local intensity minimum is applied to the sample in a close region of the singulated emitter, with intensity increase areas adjoining the intensity minimum of the illumination light in at least one spatial direction on both sides.

On the one hand, the illumination light may be excitation light that stimulates the emitter to emit an emission, in particular a fluorescence emission or a scattered light emission. However, the illumination light may also be an emission inhibition light that prevents, reduces or completely suppresses an emission from the emitter, i.e. an emission emanating from the emitter. In particular, the emission inhibition light may be a stimulation light that induces a stimulated emission of an electronically excited emitter and thus prevents a subsequent (fluorescent) emission of the emitter. If the illumination light is not itself an excitation light, the emitter is additionally illuminated with a separate excitation light.

Emissions from the emitter are detected. Furthermore, the respective current position of the intensity distribution in the sample is detected by measurement or a measured variable is detected or several measured variables are detected, from which the respective current position of the intensity distribution of the illumination light in the sample can be determined or, in certain embodiments, is determined. The detection by measurement is carried out in such a way that the current position of the intensity distribution in the sample can be or is assigned to the detected emissions in each case. Here, the position of the intensity distribution of the illumination light is generally understood to be the position of a focal point of the illumination light, at which in particular the local intensity minimum of the intensity distribution of the illumination light is formed. In the following, the term "position of the illumination light in the sample" is used synonymously with the term "position of the intensity distribution of the illumination light in the sample".

The method according to the disclosure differs from the MINFLUX methods known from the prior art in that the intensity distribution of the illumination light is not positioned at successive, well-defined scanning positions in the sample or moved continuously along well-defined paths in the sample, but that the intensity distribution fluctuates in a non-deterministic manner in the close region around a nominal position in the sample. This does not exclude the possibility that the intensity distribution relative to the sample may additionally also be displaced in a controlled manner, in particular with beam positioning means or by moving the sample; however, controlled positioning or movement of the intensity distribution in the sample is not necessary during the performance of the method according to the disclosure. The method according to the disclosure thus offers the advantage that a highly accurate and highly stable positioning of the intensity distribution in the sample is not required and the method can also be used if the beam path of the illumination light comprises means for influencing the illumination light, for example beam deflection means, which do not meet the highest requirements for dynamics, positioning accuracy and positioning stability (as required by conventional MINFLUX methods).

From the emissions detected during the measurement and assigned to the respective current position of the intensity distribution, the position of the emitter in the sample during the measurement period can be determined directly afterwards or separately in an evaluation step. Therein, both the determination of the respective current positions of the intensity distribution of the illumination light in the sample from the measured variable(s) and the assignment of the respective current positions of the intensity distribution of the illumination light in the sample to the respective detected emissions may take place in the downstream evaluation step. To make this possible, the recorded measured variables and the detected emissions may, for example, be assigned to each other or registered assigned to a common time axis. If the position of the emitter in the sample is to be determined during the measurement period directly following the measurement, the current positions of the intensity distribution of the illumination light in the sample are assigned to the respective detected emissions during the measurement period or directly following the measurement. If the current position of the intensity distribution in the sample is not measured directly, the current positions of the intensity distribution of the illumination light in the sample are also determined from the measured variable(s) during the measurement period or directly after the measurement. Several positions of the emitter belonging to different sub-periods may also be determined from a continuous measurement at a nominal position. This also applies if the position of the emitter in the sample, or more precisely, the positions of the emitter, are determined separately from the measurement in a subsequent evaluation step. The several determined positions may describe a trajectory of the emitter. If the position of the emitter in the sample can be assumed to be fixed, a measurement uncertainty with regard to the determination of the position may be inferred from the multiple determined positions.

Successive measurement cycles may also be carried out, wherein a position of the emitter is determined for each measurement cycle. After a measurement cycle has been completed, further measurement cycles may be carried out on the same emitter in order to determine its position over time (tracking). In particular, if the emitter can diffuse in the sample or if the emitter moves directionally in the sample so that the position of the close region of the emitter in the sample can or does change over time with the position of the emitter in the sample, it is advantageous to determine the position of the emitter between successive measurement cycles and to update the nominal position of the intensity distribution of the illumination light. Therein, the updated nominal position may correspond to the position determined for the previous measurement cycle. However, the updated nominal position may be derived from the positions determined in several previous measurement cycles, for example if the emitter moves directionally in the sample. For carrying out the further measurement cycle or for each measurement cycle following a measurement cycle, the light intensity of the illumination light may optionally be changed, in particular increased, and/or a property of the fluctuation of the illumination light in the sample may be adjusted; the relevant properties are discussed in more detail below. In this way, for example, an iterative MINFLUX method can be implemented.

In a preferred embodiment of the method, the nominal position of a first measurement cycle performed according to the disclosure is a presumed position of the emitter in the sample, which is determined in a pre-localization step. For this purpose, a localization with an independent method, in particular with lower accuracy, can be used (for example raster scanning or PALM/STORM localization), but a previous MINFLUX localization, for example as known from the prior art, may also be used for the pre-localization. In a preferred embodiment, for example, an iterative MINFLUX measurement may also be carried out, in which the intensity distribution of the illumination light is positioned at successive, well defined scanning positions in the sample or moved continuously along well-defined paths in the sample in each step of the iteration, which is followed by a measurement or which is followed by several measurement cycles, in which the position of the intensity distribution in the sample fluctuates around a nominal position and in which the current position of the intensity distribution of the illumination light determined by measurement is assigned to the emissions in each case.

In another embodiment, particularly applicable in the context of (drug) screening applications, the nominal position may also be a known or predetermined binding site in the sample to which a structure labeled with the emitter is bound or can bind.

In a preferred embodiment of the method, the fluctuation of the position of the illumination light around a nominal position in the sample is caused by one or more movable components of a beam positioning device, for example a beam scanner in a beam path of the illumination light. This movable component or these movable components may be, for example, one or more tilting mirrors of a galvo scanner system, which may also be used for other (image) recording modalities or is intended for these. The movable component may be a component of a light displacement unit or a movable sample stage, for example a piezo-electrically actuated sample stage.

If the movable component is a tilting mirror or if the movable components are tilting mirrors, the current position of the intensity distribution in the sample may be determined in particular from the deflection of the tilting mirror or from the set of deflections of the tilting mirrors. The deflection of the tilting mirror or each tilting mirror may be measured, for example, if the tilting mirrors are each part of a galvo scanner, with an integrated rotation encoder or using an auxiliary light beam, possibly an auxiliary light beam for each mirror, which is also deflected by the associated tilting mirror, and directed onto a position-sensitive light detector. In particular, if one auxiliary light beam is used per tilting mirror, an auxiliary light beam for measuring the deflection may also be directed to the rear of the mirror, but preferably the auxiliary light beam is directed to the front of the mirror, i.e. the side of the mirror that reflects the illumination light beam. The current position of the intensity distribution of the illumination light in the sample may then be determined from the measured deflection of the tilting mirror or the measured deflections of the tilting mirrors. When determining the current position of the intensity distribution of the illumination light in the sample, the imaging properties of the optical device with which the illumination light beam is directed into the sample and focused must be taken into account; the skilled person is familiar with how this can be done. If, in addition to one or more tilting mirrors, the beam scanner comprises other movable components that contribute to the fluctuation of the position of the intensity distribution in the sample, their current settings may also be measured and taken into account when determining the current position of the intensity distribution of the illumination light in the sample.

In a further preferred embodiment, the respective current position of the intensity distribution in the sample may be determined by guiding an auxiliary light beam over all components of the beam scanner, which together cause the fluctuation of the position of the intensity distribution in the sample, in such a way that the auxiliary light beam undergoes a deflection identical to the deflection of the illumination light beam, wherein the deflection of the auxiliary light beam is detected by measurement. The deflections may result in a displacement of the relevant light beam at a location of an intermediate image with respect to an optical axis of the beam path and a change in angle at a location of an intermediate image with respect to an optical axis of the beam path. Here, the displacement at a location of an intermediate image corresponds to a tilt at a location of a pupil, and a tilt at a location of an intermediate image corresponds to a displacement at a location of a pupil.

In a further embodiment, an auxiliary light beam may be deflected identically to the deflection of the illumination light beam by coupling an auxiliary light beam into the beam path of the illumination light beam by means of a beam splitter on one side of the relevant components of the beam scanner and extracting it on the other side of these components by means of a further beam splitter; after extracting, the auxiliary light beam is directed to one or more position-sensitive detectors in such a way that the above-mentioned displacement or the tilt or both the above-mentioned displacement and the tilt can be determined from the measurement signals. The corresponding position of the intensity distribution of the illumination light in the sample is then determined from the displacement and/or the tilt. The beam splitting is based on the fact that the auxiliary light beam and the illumination light beam have certain different optical properties, in particular they may comprise different wavelengths or different polarizations. Which quantity or which quantities—tilt, offset or tilt and offset—are particularly measured depends on the structure of the beam scanner, in particular whether it is configured as a pupil scanner or, for example, as a quad scanner with four tilt mirrors positioned around an intermediate image position; quad scanners are described, for example, in the international patent disclosure WO 2010/069987 A1. In certain embodiments, in which the components of the beam scanner causing the fluctuation of the position of the illumination light form a quad scanner, the offset in particular is measured at a location of an intermediate image, and further particularly both the offset and the tilt are measured. Measuring both variables makes it possible to determine the position of the illumination light in the sample with high precision, taking into account the influence of a displacement of the illumination light beam in the pupil of the objective focusing the illumination light. This also applies if the relevant components of the beam scanner form or contain a pupil scanner. In these embodiments, the current position of the intensity distribution of the illumination light in the sample is determined from the displacement and/or tilt detected by measurement. Therein, the imaging properties of the optical device with which the illumination light beam is directed into the sample and focused must be taken into account; the skilled person is familiar with how this can be done.

That an auxiliary light beam is guided over all components of the beam scanner that act together to cause the fluctuation of the position of the intensity distribution in the sample in such a way that the auxiliary light beam undergoes a deflection identical to the deflection of the illumination light beam may also be achieved, by coupling an auxiliary light beam of the relevant components of the beam scanner at a flat angle into the beam path of the illumination light beam in such a way that it is deflected by all relevant components of the beam scanner in the same way as the illumination light beam, and by extracting it from these components at a flat angle.

In a further embodiment, a portion of the light beam emanating from an illumination light source, after it has been guided over all components of the beam scanner that act in conjunction to cause the fluctuation of the position of the intensity distribution in the sample, can be extracted from the light beam emanating from the illumination light source by means of a beam splitter. The portion extracted from this light beam is then directed to one or more position-sensitive detectors in such a way that the displacement or the tilt or both the displacement and the tilt that the extracted portion of the light beam has undergone due to the relevant components of the beam scanner can be determined from the measurement signals.

The fluctuation of the position of the illumination light around a nominal position in the sample may be caused by rapid irregular or apparently irregular movements of the mechanical components of the beam positioning device that displace the beam, for example tilting mirrors in a galvo scanner system, which these mechanical components perform. Galvo scanners and galvo scanner systems that are operated in a closed loop, just like piezo-actuated sample tables, for example, also perform permanent corrections as a result of continuous tracking by the control loop in order to achieve the target position of the control loop; these corrections are also irregular or appear to be irregular. The rapid irregular movements or movements that appear to be irregular, for example of the tilting mirrors, are referred to as jitter in the context of this application. In the context of this application, the term jitter covers not only movements of the tilting mirrors about their tilting axis, but also all rapid movements of the tilting mirrors that lead to irregular or apparently irregular deflections of the illumination light and thus to a fluctuation in the position of the illumination light in the sample. In the context of this application, the term jitter also covers corresponding movements of components of other mechanical scanners or corresponding movements of other components of a beam positioning device such as, for example, a positionable sample stage or other light deflection units; it is essential for the presence of jitter that there is an irregular or irregularly appearing movement of a component of the microscope, wherein the movement of the component affects the position of the intensity distribution of the illumination light. Jitter can therefore also be present, for example, if a component such as a deflecting mirror or a lens, which is basically stationary or cannot be moved automatically in a deterministic manner, actually performs irregular or apparently irregular movements. Irregular appearing movements are understood to be movements that have a regular nature, but whose regularity is not known or is not detected. Jitter may also occur in particular in the event that a setpoint position of the beam positioning device is constant over a period of time. In this case, the jitter causes a fluctuation in the position of the intensity distribution of the illumination light around a target position, i.e. it causes the position of the illumination light to fluctuate around a nominal position in the sample.

Rapid, irregular or seemingly irregular movements of one or more moving components of a beam positioning device may also be caused by vibrations or sound, for example by ambient noise.

However, jitter may also be caused, for example, by magnetic field fluctuations in the galvo drive of a galvo scanner or, in the case of MEMS scanners, by fluctuations in electric fields.

The jitter inherent in the beam positioning device, caused by environmental influences or introduced by a control loop, can, if necessary depending on the properties of the imaging system with which the illumination light is imaged or focused into the sample, in particular on its magnification, already suffice for a sufficiently large region around the emitter in the sample to be covered by the illumination light for carrying out the method according to the disclosure, so that no additional fluctuation in the position of the illumination light in the sample needs to be introduced.

If the jitter inherent in the beam positioning device, caused by environmental influences and/or introduced by a control loop, which occurs with a basic setting of the control parameters, does not cause sufficient fluctuation of the position of the illumination light in the sample, the fluctuation may be specifically amplified.

For example, the strength of the corrective movements introduced by the control loop depends on the selected control parameters. In PID controllers, for example, particularly large proportional and differential components lead to fast control movements and high amplitudes. These increase particularly strongly if the control loop is operated near resonant frequencies. In this respect, in a further embodiment of the method, the control parameters are selected in such a way that the position of the intensity distribution of the illumination light fluctuates in such a way that during the performance of a measurement in accordance with the disclosure current positions are reached that have a predetermined or predeterminable minimum distance from the nominal position. The control parameters may also be selected so that the fluctuation has predetermined or predeterminable moments, for example a predetermined or predeterminable variance. The fluctuation around the nominal position may be approximately normally distributed. In general, the control-based jitter may be conditioned by specifically setting the control parameters.

Another way to specifically increase the fluctuation is to actively excite jitter, i.e. to cause an excited jitter. For example, sound or ultrasound may be used in a targeted manner to act on the beam positioning device or individual components or an individual component of the beam positioning device, wherein the effect may be mediated by the mounting of the component.

In another embodiment of the method, a random signal is applied to a control input of the beam positioning device so that a fluctuation of the position of the intensity distribution of the illumination light about the nominal position is effected, the random signal particularly being conditioned in such a way that a desired fluctuation, i.e. a fluctuation with set statistical properties, of the position of the intensity distribution of the illumination light about the nominal position is effected. The conditioning of the random signal may take into account a jitter introduced in a different way, wherein the relevant control parameters may be both the control parameters of a basic setting of the beam positioning device and specifically set control parameters.

The random signal may be generated in particular using an analog or digital signal generator, whereby random signals with well-defined statistical properties, in particular with predetermined or predeterminable spatial distributions, may be generated. The spatial distribution particularly comprises no preferred direction, at least in the spatial directions considered for the localization of the emitters, so that the introduction of systematic errors in the localization is avoided. In particular, the spatial distribution is particularly rotationally symmetrical with respect to an axis that contains the nominal position. This axis may in particular be the optical axis of a microscope objective with which the intensity distribution of the illumination light in the sample is formed.

The spatial distribution may be normally distributed or at least approximately normally distributed around the nominal position. In this case, the intensity distribution covers in particular the immediate vicinity of the nominal position in the sample, while positions at a greater distance from the nominal position are reached less frequently. This can be favorable with regard to the information content of detected photons in relation to the position of the emitter to be localized, because the information content of the detected photons is higher the closer the emitter is to the minimum of the intensity distribution of the illumination light when it is excited, if no background photons influence the measurement.

The spatial distribution may also be a homogeneous distribution or a spatial distribution that comprises a probability amplitude that is inverse to the normal distribution. For example, the spatial distribution may be a top hat distribution or a ring-shaped spatial distribution with a central minimum and a maximum value at a defined distance from the nominal position. In these embodiments, the nominal position is then no longer necessarily the location with the highest probability of occurrence. Such distributions can be particularly advantageous with regard to tracking an emitter.

A further embodiment of the method is characterized in that a position of the emitter is estimated from the positions of the intensity distribution assigned to the emissions. This may be done, for example, in a manner known from the prior art using a position estimator, e.g., a least-mean-squares estimator or a maximum likelihood estimator. For example, an estimator may correspond to a vector sum or be derived from a vector sum. In principle, suitable estimators are known from the prior art, for example from the European patent disclosure EP 3 951 470 A1.

As already indicated above, particularly in certain embodiments in which an iterative MINFLUX method is implemented, in particular in which the nominal position is updated after the position of the emitter has been estimated, the properties of the fluctuation may be adapted from measurement cycle to measurement cycle as indicated above. For example, a first measurement cycle may be performed using a homogeneous or a ring shaped spatial distribution of the fluctuation of the position of the illumination light around a nominal position in the sample, wherein the fluctuation is caused by the application of random signals to a control input or to control inputs of the beam positioning device, while in one or more subsequent measurement cycles the fluctuation is caused by a control-based jitter or an excited jitter, respectively, for example where control parameters of the beam positioning device are adjusted between measurement cycles, and wherein in, for example, a last measurement cycle an inherent jitter of a mechanical beam scanner, which forms the beam positioning device or which is contained in the beam positioning device, causes the fluctuation of the position of the illumination light.

A second aspect of the disclosure relates to a MINFLUX microscope or a STED-MINFLUX microscope for localizing or tracking a singulated emitter in a sample. The microscope comprises a microscope control device. The microscope control device may be configured in particular in such a way that the localization or tracking can be or is carried out according to one of the methods described above. The MINFLUX microscope or the STED-MINFLUX microscope comprises a light source which is configured to provide an illumination light and an illumination optics which is configured to apply an intensity distribution of the illumination light with a local intensity minimum to the sample in a close region of the singulated emitter.

The illumination light may be excitation light that stimulates the emission of the emitter. However, the illumination light may also be emission inhibition light (in particular STED light), which reduces the emission of the emitter depending on its intensity. In this case, the MINFLUX microscope comprises a further light source that provides an excitation light that excites the emitter to emit and that is superimposed in the sample with the intensity distribution of the illumination light, i.e. at least two light sources in total. The MINFLUX microscope may also comprise a primary light source, in particular a primary laser light source, and a device by means of which both excitation light and emission inhibition light, in particular STED light, are generated from primary light. This and corresponding similar cases are understood as cases in which the MINFLUX microscope comprises at least two light sources.

The illumination optics comprise at least one microscope objective, with which the illumination light is focused into the sample, and a wavefront modulator, with which the wavefront of the illumination light is modulated, so that when it is focused, a central intensity minimum with intensity increase areas on both sides in at least one direction results. For example, phase plates with a fixed phase delay varying over a beam cross-section or adjustable wavefront modulators, in particular programmable wavefront modulators (spatial light modulator, SLM) such as programmable amplitude modulators based on liquid crystals and in particular programmable phase modulators based on liquid crystals, can be used as wavefront modulators. Corresponding wavefront modulators are known to the skilled person from the prior art for STED microscopy or MINFLUX microscopy.

The microscope according to the disclosure further comprises a beam positioning device in the beam path of the illumination light, which is configured to shift the intensity distribution of the illumination light in the sample. The beam positioning device does not have to be provided specifically for carrying out the method according to the disclosure; it may also be a device provided in the microscope for other purposes. In particular, the beam positioning device may be part of a beam scanner for image acquisition by means of raster scanning.

In a further embodiment, the beam positioning device comprises a beam scanner, further in particular a galvo scanner. In a further embodiment, the beam positioning device comprises a galvo scanner system comprising a plurality of galvo scanners. In further embodiments, the galvo scanners of the galvo scanner system each comprise an integrated angular position measuring system, in particular an integrated encoder, for example a rotary encoder.

The microscope according to the disclosure comprises a measuring device for acquiring measurement data from which a current position of the intensity distribution of the illumination light in the sample can be determined. A current position of the intensity distribution may belong to a single measurement datum or to a set of several measurement data. In particular, the measuring device is configured to acquire measurement data from which the position of the intensity distribution of the illumination light in the sample can be determined with an uncertainty of at most 10 nm, particularly of at most 5 nm, more particularly of at most 2 nm and most particularly of at most 1 nm.

In a further embodiment, the microscope according to the disclosure comprises a position determination unit which is configured to determine current positions of the intensity distribution of the illumination light in each case from the measurement data or the sets of measurement data, further particularly to determine the current position of the intensity distribution of the illumination light in each case in the sample with an uncertainty of at most 10 nm, particularly of at most 5 nm, further particularly of at most 2 nm and particularly particularly of at most 1 nm.

In further embodiments, the integrated angular position measuring systems of the galvo scanners of the beam positioning device are elements of the measuring device for acquiring measurement data from which a current position of the intensity distribution of the illumination light in the sample can be determined, i.e. the angular position measuring systems are not only used to control the respective galvo scanners, but the current angular position information is output or transferred in each case as a measured value such that it serves as the basis for determining the respective current position of the illumination light in the sample. In particular, the current angular position information is assigned to a point in time at which the angular position information is recorded. The assignment to a point in time may be made, for example, by writing the angular position information in registers, with a fixed, short time interval belonging to adjacent entries.

In a further embodiment, the measuring device for acquiring measurement data, from which a current position of the intensity distribution of the illumination light in the sample can be determined, comprises a device for generating an auxiliary light beam, which is coupled into a beam path of the illumination light in such a way that the auxiliary light beam is guided over all components of the beam scanner, which in interaction cause the fluctuation of the position of the intensity distribution in the sample, in such a way that the auxiliary light beam in each case undergoes a deflection identical to the deflection of the illumination light beam, and a measuring device with which the deflection of the auxiliary light beam is determined by measurement.

The auxiliary light beam may be coupled into the beam path of the illumination light beam by introducing the auxiliary light beam into the beam path of the illumination light beam at a flat angle on one side of the relevant components of the beam scanner in such a way that the auxiliary light beam is deflected by all relevant components of the beam scanner in the same way as the illumination light beam, and extracting it on the other side of these components at a flat angle. In this embodiment, the auxiliary light may simultaneously match both the wavelength and the polarization of the illumination light or the other light. It may therefore be light from the illumination light source or, if the illumination light is an emission inhibition light, from the other light source. Further particularly, the measuring device for acquiring measurement data, from which a current position of the intensity distribution of the illumination light in the sample can be determined, comprises a separate auxiliary light source that generates an auxiliary light beam that is easily separable from the illumination light beam and, if the illumination light is emission inhibition light, from excitation light and, further particularly, is also easily separable from the emission of the singulated emitters, in particular an auxiliary light beam in a separate wavelength range. If such a separable auxiliary light beam is used, the microscope may, in certain embodiments, comprise a beam splitter on one side of the relevant components of the beam scanner for coupling the auxiliary light beam into the beam path of the illumination light beam and a further beam splitter on the other side of these components for extracting the auxiliary light beam from the beam path of the illumination light beam.

In an alternative embodiment, the measuring device for acquiring measurement data, from which a current position of the intensity distribution of the illumination light in the sample can be determined, comprises a beam splitter in the beam path of the illumination light after all components of the beam scanner, which in interaction cause the fluctuation of the position of the intensity distribution in the sample, with which a portion of the light beam emanating from an illumination light source is extracted from the beam path of the illumination light as an auxiliary light beam.

In these alternative embodiments, the measuring device for acquiring measurement data from which a current position of the intensity distribution of the illumination light in the sample can be determined also comprises a device with which the deflection of the auxiliary light beam is detected. In particular, this device comprises one or more position-sensitive light detectors, for example one or more position-sensitive photodiodes (position sensitive device, PSD) or one or more pixelated line or area detectors, e.g. a CCD camera. In particular, the device comprises further optical elements with which the auxiliary light beam or a part of the auxiliary light beam is focused onto the position-sensitive detector(s) or is collimated before hitting the position-sensitive detector(s). In particular, the measuring device for acquiring measurement data from which a current position of the intensity distribution of the illumination light in the sample can be determined comprises a beam splitter in the beam path of the auxiliary light beam after extraction from the illumination light beam. The beam splitter makes it possible to detect the deflection of the auxiliary light beam by detecting a displacement of the auxiliary light beam in an intermediate image plane of the microscope and by detecting a tilt of the auxiliary light beam in an intermediate image plane of the microscope with respect to an optical axis.

A measuring device for acquiring measurement data, from which a current position of the intensity distribution of the illumination light in the sample can be determined, may comprise both a device for generating an auxiliary light beam, which is coupled into a beam path of the illumination light in such a way that the auxiliary light beam is guided over all components of the beam scanner, which in interaction cause the fluctuation of the position of the intensity distribution in the sample, in such a way that the auxiliary light beam in each case undergoes a deflection identical to the deflection of the illumination light beam, and a measuring device with which the deflection of the auxiliary light beam is detected by measurement, as well as further devices, for example those with which settings of individual elements of the beam scanner are measured, such as integrated angular position measuring systems, in particular those as described above. Generally speaking, the presence of one of the aforementioned measuring devices for acquiring measurement data does not preclude the presence of other of the aforementioned measuring devices for acquiring measurement data in the microscope. If different types of measuring devices are present, these may form a common measuring device. This also applies if several measuring devices supply corresponding information to each other, so that redundant information is available. This redundancy may then be used, for example, to reduce the uncertainty of determining the position of the intensity distribution of the illumination light in the sample or to detect misbehavior of the microscope if the measurement data is not consistent.

The microscope according to the disclosure further comprises a detection device which is configured to detect emissions from the emitter.

The microscope control device is configured to register the respective current position of the intensity distribution of the illumination light in the sample and/or the respective measurement data for a respective detected emission. The fact that measurement data is registered for detected emissions means that the detected emissions can be assigned or are assigned to the respective current positions of the intensity distribution of the illumination light in the sample. The fact that the emissions can be assigned to the current positions can be achieved in particular by the fact that, on the one hand, the detection device records each detected emission in a time-resolved manner and that, on the other hand, the measuring device, which acquires the measurement data from which a current position of the intensity distribution of the illumination light in the sample can be determined, records the measurement data in a time-resolved manner. The fact that measurement data is registered for detected emissions can mean in particular that the relevant values are stored assigned to each other directly or indirectly, for example via a common time coordinate. Both components of the detection device and the measuring device may be integral parts of the microscope control device.

In an embodiment, the microscope control device is configured such that the emissions detected by the detection device are assigned to the respective current positions of the intensity distribution of the illumination light in the sample, and further particularly such that the emissions detected by the detection device are continuously assigned to the respective current positions of the intensity distribution of the illumination light in the sample while measurements are being carried out.

Particularly, the detection device is configured to detect individual emission events, particularly to detect individual photons, and the microscope control device is configured to assign the detected individual emission events to a time of detection.

In a particular embodiment, the MINFLUX microscope comprises a signal generator for generating a random signal, as well as a control input for the beam positioning device, to which the random signal from the signal generator is applied. In particular, the signal generator is configured as a digital signal generator that generates random signals with well-defined statistical properties, in particular with predetermined or predeterminable spatial distributions.

Advantageous further embodiments of the disclosure are shown in the claims, the description and the drawings and the associated explanations of the drawings. The described advantages of features and/or combinations of features of the disclosure are merely exemplary and may have an alternative or cumulative effect. With regard to the disclosure (but not the scope of protection) of the original application documents and the patent, the following applies: Further features can be found in the drawings—in particular the relative arrangements and active compounds shown.

The combination of features of different embodiments of the disclosure or of features of different claims is also possible in deviation from the selected back relationships of the claims and is hereby suggested. This also applies to those features which are shown in separate drawings or mentioned in their description. These features may also be combined with features of different claims. Likewise, features listed in the claims may be omitted for further embodiments of the disclosure, but this does not apply to the independent claims of the granted patent.

DESCRIPTION OF THE FIGURES

Figure 1:
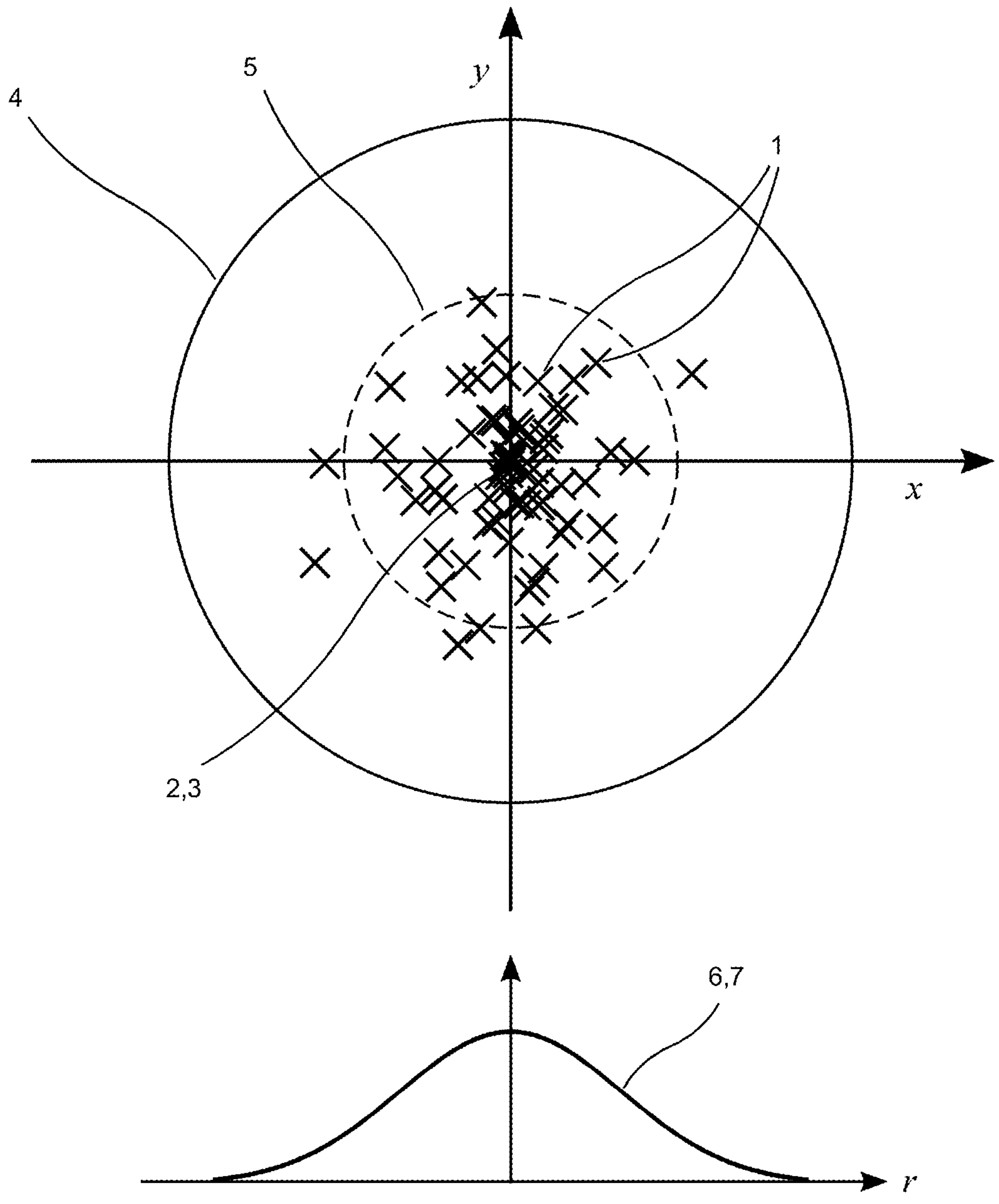
FIG. 1 shows a position fluctuation of the intensity distribution.

FIG. 1 shows a fluctuation in the position of the intensity distribution of the illumination light 12 in the sample 14, as can be used for the method according to the disclosure. The scatter plot shows the present positions, i.e. the respective current positions 1, of the intensity distribution, with each point representing a present position, i.e. a respective current position 1, of the intensity distribution of an equidistantly sampled time series. For the intensity distribution of the illumination light 12 comprising a central minimum, the current position 1 is in particular the current position 1 of the central minimum of the intensity distribution. Therein, the majority of the current positions lie within the inner region 5 around the nominal position 2 (which corresponds to the presumed position of the emitter 8 to be localized), wherein the dimension of the inner region 5 is in accordance with the usual dimensions for scanning in MINFLUX microscopy, for example in the range between 30 nm and 300 nm.

The scatter plot shown corresponds to the radial spatial distribution function 6 shown under the scatter plot, according to which the current positions 1 are normally distributed and rotationally symmetrical around the nominal position 2 localized at the coordinate origin 3, i.e. the radial spatial distribution function 6 corresponds to a normal distribution 7. Such a distribution may result in good approximation, for example, from an inherent, in particular control-based, jitter of a galvo scanner system 32.

The size of the inner region 5 may, for example, be determined by a corresponding selection of control parameters of a galvo scanner system 32. The size of the inner region 5 and the control parameters may be determined in such a way that a fixed proportion of all current positions 1, for example a proportion of 95%, is located within the inner region 5 on average over a measurement period. In the example shown, all current positions 1 are located within the close region 4. However, this does not have to be the case in all embodiments. In particular, if the inner region 5 is chosen to be large, current positions 1 may also be located outside the close region 4. The emissions registered at the current positions 1 located outside can then be disregarded in the localization of the emitter 8 or evaluated separately, for example with regard to the determination of a background and taken into account accordingly in the localization of the emitter 8.

Figure 2:
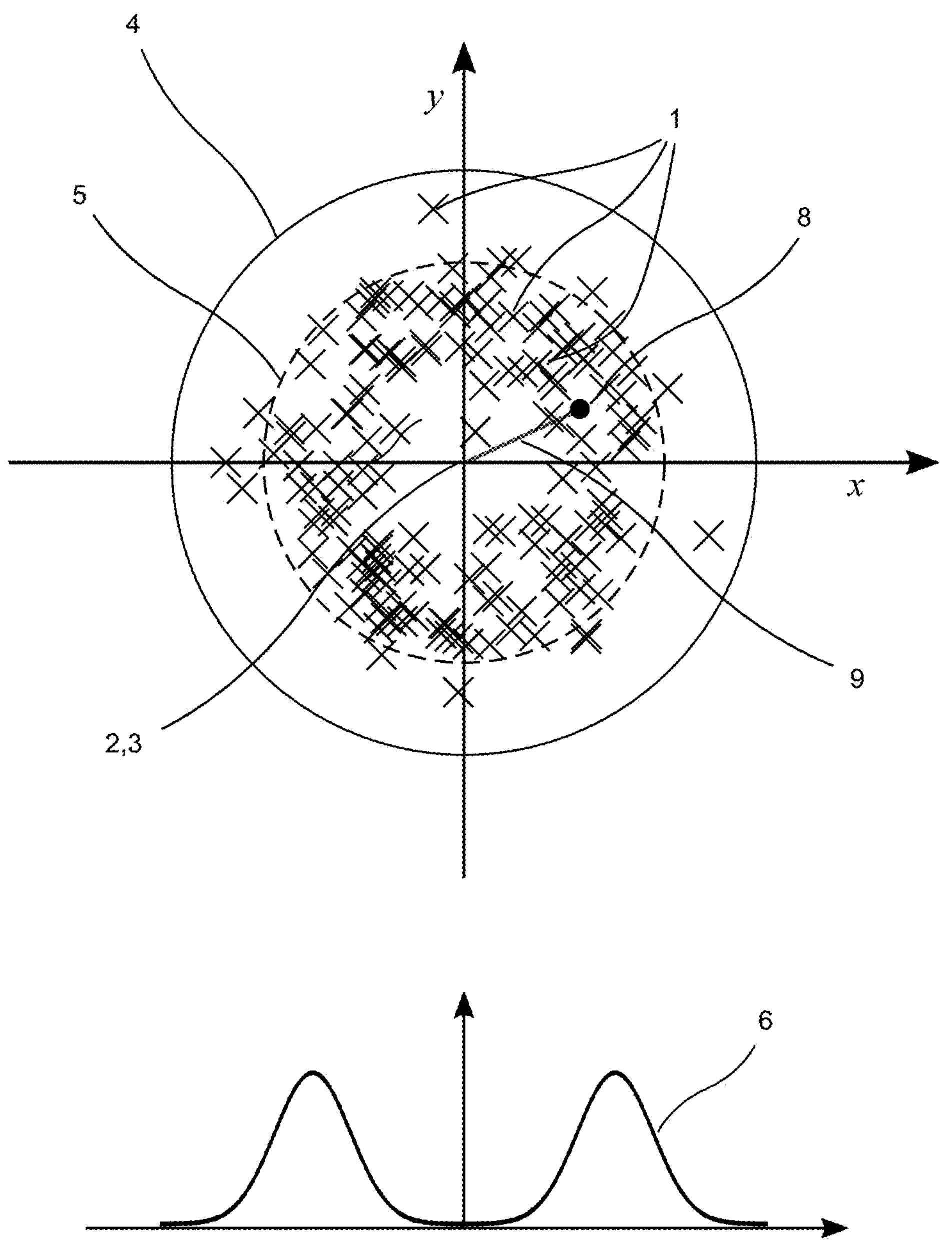
FIG. 2 shows a position fluctuation of the intensity distribution.

FIG. 2 shows an alternative particular fluctuation of the position of the intensity distribution of the illumination light 12 in the sample 14. As the scatter plot of the current positions 1 of the intensity distribution shows, the density of the points in the center is low here and increases with increasing radius up to a maximum value, only to fall again with further increasing radius. FIG. 2 shows the emitter 8, whose position in the example shown is at a comparatively large distance 9 from the nominal position 2, which corresponds to the position of the emitter 8 assumed before carrying out the method according to the disclosure; the distance 9 is marked in FIG. 2 by means of a connecting line from the nominal position 2, which corresponds to the coordinate origin 3, to the emitter 8. The fluctuation of the position of the intensity distribution of the illumination light 12 around a nominal position 2 in the sample 14 according to such a distribution offers the advantage that the set of current positions 1 used for scanning the emitter 8 comprises with great certainty a sufficient number of positions in each spatial direction of the scan on both sides of the emitter 8 for localization. Such a distribution of the current positions 1 is particularly favorable if the presumed position of the emitter 8 has a high uncertainty.

Figure 3:
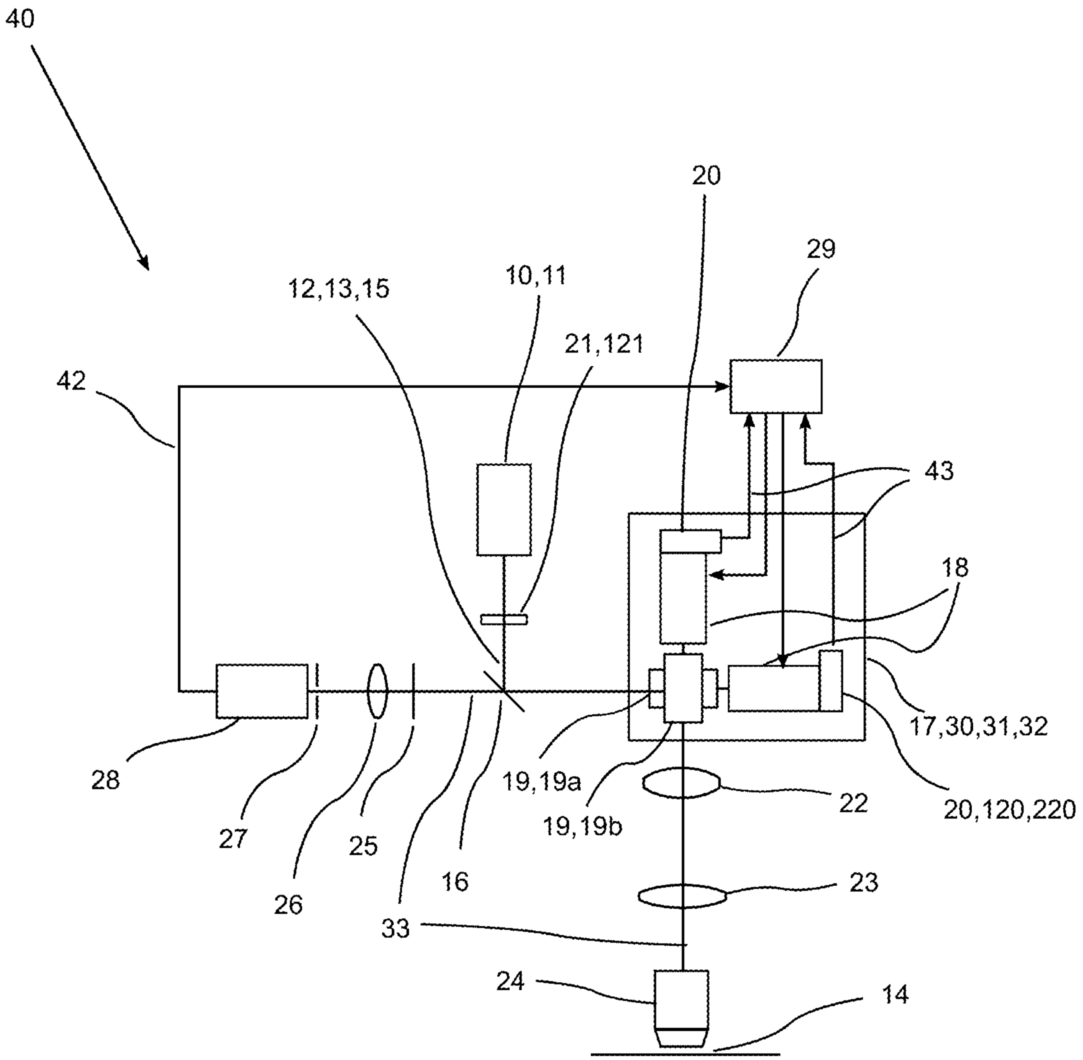
FIG. 3 shows a MINFLUX microscope according to the disclosure.

FIG. 3 shows a MINFLUX microscope 40 according to the disclosure, which is based on a conventional confocal laser scanning microscope. The MINFLUX microscope 40 comprises a light source 11, which is conventionally configured as a laser 10 and emits illumination light 12, which in this case is excitation light 13 for singulated emitters 8 contained in the sample 14. The illumination light beam 15 is directed by a beam splitter 16 into a light displacement unit 30, which is configured here as a beam scanner 31, specifically as a galvo scanner system 32, which enables the illumination light beam 15 to be deflected in two spatial directions. For this purpose, the galvo scanner system 32 comprises two tilting mirrors 19, each mounted on a galvo motor 18, whose axes of rotation are perpendicular to each other, i.e. two galvo scanners that deflect the illumination light beam 15 in spatial directions oriented perpendicular to each other. The galvo motors 18 for scanning the sample 14 with the illumination light 12 are controlled via a scan controller integrated into the microscope control device 29. The galvo motors 18 of the galvo scanners assigned to the tilting mirrors 19 comprise integrated angular position measurement systems 20, here specifically encoders 120, which may be configured as rotary encoders 220, with which the angular position of the galvo motors 18 and thus of the tilting mirrors 19 is determined. In the example shown, the tilting mirrors 19 are each positioned close to a pupil, i.e. close to a plane conjugate to the rear pupil of the objective 24. In an alternative arrangement, not shown in the figure, a relay optic may be located between the two scanners, in which case both the tilting mirror 19*a* and the tilting mirror 19*b* are particularly each placed in a pupil.

The illumination light 12 emerging from the galvo scanner system 32 is imaged into the rear pupil of the objective 24 via an imaging system comprising a scan lens 22 and a tube lens 23, which focuses the illumination light 12 into the sample 14. A change in the angle of the tilting mirror 19 translates into a change in the angle of the illumination light beam 15 in the pupil of the objective 24 and thus into a displacement of the focused illumination light 12 in the sample 14.

The light 33 emitted by the emitters 8 in the sample 14 is collected through the objective 24 and travels in the opposite direction to the direction of the illumination light beam 15 to the beam splitter 16, which transmits the emitted light 33 from the emitter 8 and thus separates it from the illumination light 12. The beam splitter 16 may be configured in particular as a (dichroic) color splitter. The detection system arranged behind the beam splitter 16 comprises a filter 25, which blocks unwanted stray light components, and a lens 26, with which the light 33 emitted by the emitters 8 is focused onto the detector 28 through a (confocal) pinhole 27.

The MINFLUX microscope 40 differs from a conventional confocal microscope on the one hand in that a wavefront modulator 21, in the specific example shown a phase plate 121, is additionally arranged in the illumination light beam 15, which spatially modulates the wavefront of the illumination light beam 15 in such a way that the illumination light 12 forms an intensity distribution with a central minimum surrounded by increase areas in the sample 14 when focused by the objective 24.

The MINFLUX microscope 40 shown further differs from a conventional confocal microscope in that the microscope comprises a microscope control device 29 that assigns the current angular position of the tilting mirrors 19 to each emission registered by the detector 28. For this purpose, the microscope control device 29 receives the detector signal 42 of the detector 28 on the one hand and the position signals 43 of the galvo motors 18 emitted by the encoders 20 on the other hand. Thus, in this embodiment, the encoders 20 in conjunction with the microscope control device 29 form a measuring device for acquiring measurement data from which a current position 1 of the intensity distribution of the illumination light 12 in the sample 14 can be determined in each case.

In order to carry out the method according to the disclosure with the illustrated MINFLUX microscope 40, it is utilized that the galvo scanners of the galvo scanner system 32, and thus the galvo scanner system 32 as a whole, have an inherent, for example control-based, jitter, i.e. small, random rotational movements which translate into a fluctuation in the position of the intensity distribution of the illumination light 12 in the sample 14, so that the intensity distribution of the illumination light 12 in a close region 4 around the nominal position 2 in particular sweeps over an inner range 5 around the nominal position 2 of the intensity distribution in the sample 14.

Figure 4:
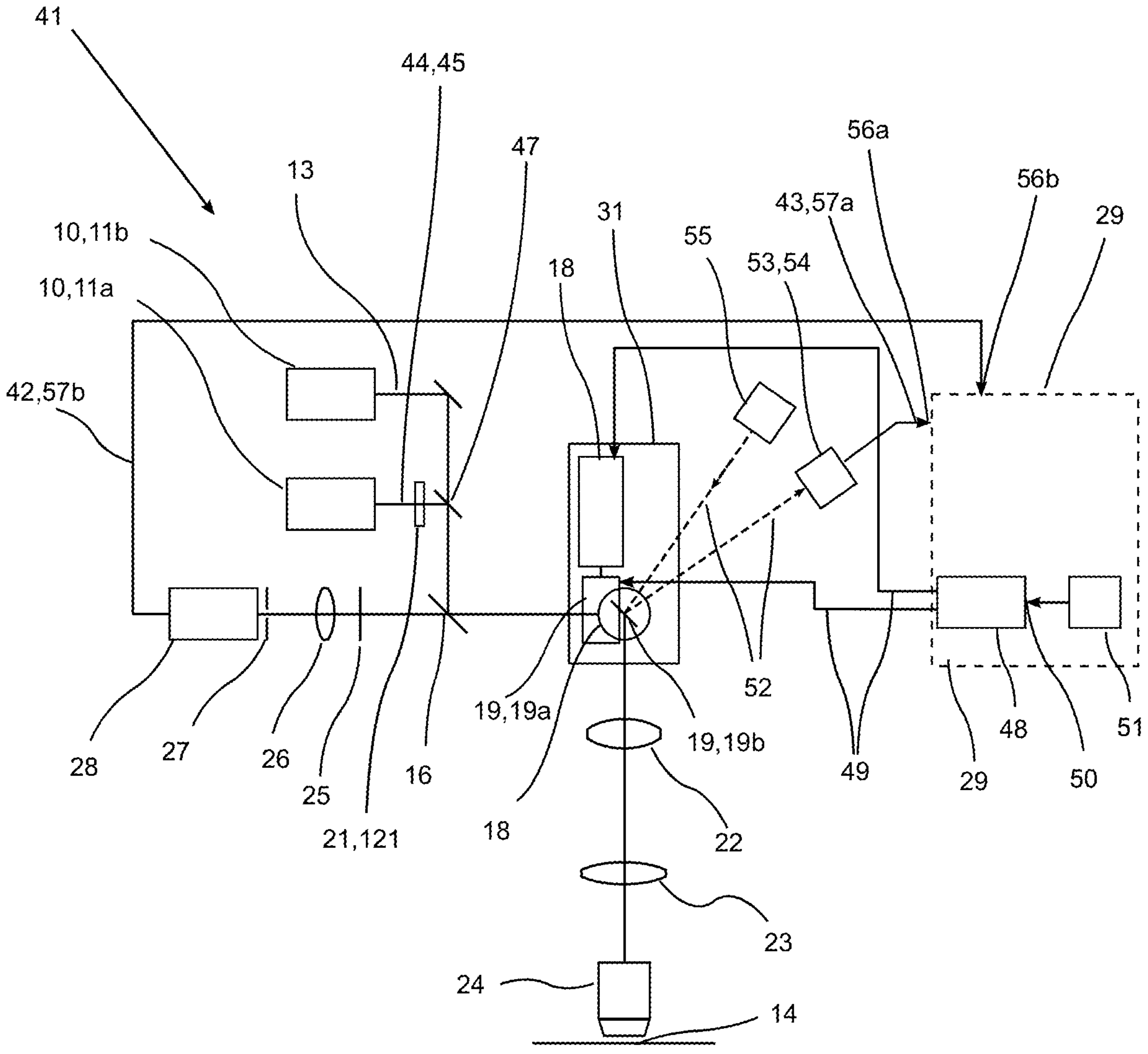
FIG. 4 shows an alternative MINFLUX microscope according to the disclosure.

FIG. 4 shows a further embodiment of a microscope according to the disclosure. The microscope is configured as a STED-MINFLUX microscope 41. The STED-MINFLUX microscope 41 comprises a first light source 11*a* configured as a laser 10 for illumination light 12, which here is emission inhibition light 44, specifically STED light 45. The microscope further comprises a second light source 11*b*, also configured as a laser 10, for excitation light 13. A wave front modulator 21 in the form of a phase plate 121 is arranged in the beam path of the emission inhibition light 44, which modulates the phase of the wave front of the emission inhibition light 44 so that when the emission inhibition light 44 is focused by the objective 24, an intensity distribution with a central minimum surrounded by increase areas results.

The excitation light 13 and the emission inhibition light 44 are combined with a beam combiner 47 and directed onto a galvo scanner system 31 using a beam splitter 16. The galvo scanner system 31 in turn comprises two tilting mirrors 19 driven by galvo motors 18. The galvo motors 18 are controlled by a scan controller 48, which generates control signals 49 for the galvo motors 18. The scan controller 48 comprises a control input 50 to which the output signal of a signal generator 51 is applied. The signal generator 51 is configured to generate a (small) random signal in order to introduce a fluctuation of the tilting mirrors 19 such that the position of the intensity distribution fluctuates about the nominal position 2; this can be achieved by the random signal being such that it causes a fluctuation of the tilting mirrors 19 about a target position associated with the nominal position 2. The random signal particularly comprises well-defined statistical properties, in particular a predetermined or predeterminable spatial distribution.

The light beam incident on the first tilting mirror 19*a* is deflected by it onto the second tilting mirror 19*b*. The second tilting mirror 19*b*, the axis of which is perpendicular to the axis of the first tilting mirror 19*a* and perpendicular to the direction of the light beam incident on it in a zero position of the first tilting mirror 19*a*, shown perpendicular to the drawing plane and offset to the right relative to the first tilting mirror 19*a* merely for reasons of simplification, deflects the incident light beam in the direction of a scan lens 22. The light beam emerging from the galvo scanner system 31 is directed via the scan lens 22 and a tube lens 23 into the rear pupil of the objective 24 and focused by the objective 24 into the sample 14. As in the embodiment of the MINFLUX microscope 40 shown in FIG. 3, the light 33 emitted by the emitters 8 in the sample 14 is collected by the objective 24, travels in a direction opposite to the direction of the excitation and emission inhibition light beams to the beam splitter 16, at which it is separated from the excitation light 13 and the emission inhibition light 44. The detection system arranged behind the beam splitter 16 comprises a filter 25, which blocks unwanted stray light components, and a lens 26, with which the light 33 emitted by the emitters 8 is focused through a (confocal) pinhole 27 onto the detector 28.

In the embodiment shown, the galvo motors 18 do not comprise any integrated angular position measurement systems 20 or do not provide a position signal 43 externally. In order to detect the current angular position of the tilting mirrors 19, a separate angular position measuring system is therefore provided in the embodiment shown, of which only the components for measuring the position of the tilting mirror 19*b* are shown for reasons of clarity. The angular measurement is based on the deflection of an auxiliary light beam 52 by the respective tilting mirror 19 to be monitored and a position measurement of the auxiliary light beam with an auxiliary light detector 53, in particular with a position-sensitive detector 54. For this purpose, the auxiliary light beam 52 emitted by an auxiliary light source 55 is directed onto the rear of the respective tilting mirror 19 whose deflection is to be monitored in each case and is reflected by this onto the corresponding auxiliary light detector 53. Each auxiliary light detector 53 is connected to a first signal input 56*a* of a microscope control device 29 via a first signal line 57*a*. The microscope control device 29 receives the respective position signals 43 of the auxiliary light detectors. The microscope control device 29 comprises a second signal input 56*b*. A second signal line 57*b*, which connects the detector 28 to the microscope control device 29, is connected to this second signal input 56*b*. The microscope control device 29 receives the respective detector signals 42 via the second signal line 57*b*. It is configured to assign the respective current position signals 43 of the auxiliary light detector 53 or the auxiliary light detectors 53 to each of the emission events registered by the detector 28. It is also possible here for a plurality of position signals 43 to be assigned to all or some emission events for each auxiliary light detector 53, i.e. for each tilting mirror 19. This makes it possible to assign not only the current position 1 of the intensity distribution in the sample 14 to the respective detected emissions, but also an uncertainty with which the current position 1 in the sample was determined.

LIST OF REFERENCE SIGNS

1 current position
2 nominal position
3 coordinate origin
4 close region
5 inner region
6 radial spatial distribution function
7 normal distribution
8 emitter
9 distance
10 laser
11 light source
11*a* first light source
11*b* second light source
12 illumination light
13 excitation light
14 sample
15 illumination light beam
16 beam splitter
17 beam positioning device
18 galvo motor
19 tilting mirror
19*a* first tilting mirror
19*b* second tilting mirror
20 integrated angular position measuring system
21 wavefront modulator
22 scan lens
23 tube lens
24 objective
25 filter
26 lens
27 pinhole
28 detector
29 microscope control device
30 light displacement unit
31 beam scanner
32 galvo scanner system
33 emitted light
40 MINFLUX microscope
41 STED MINFLUX microscope
42 detector signal
43 position signal
44 emission inhibition light
45 STED light
46 deflecting mirror
47 beam combiner
48 scan controller
49 control signal
50 control input
51 signal generator
52 auxiliary light beam
53 auxiliary light detector
54 position-sensitive detector
55 auxiliary light source
56*a* first signal input
56*b* second signal input
57*a* first signal line
57*b* second signal line
120 encoder
121 phase plate
220 rotary encoder

The invention claimed is:

1. A method for localizing or tracking a singulated emitter by means of a MINFLUX method or a STED-MINFLUX method in a sample, wherein the sample is exposed to an intensity distribution of an illumination light comprising a local intensity minimum in a close region of the singulated emitter, wherein the illumination light is excitation light or emission inhibition light, in particular STED light, and wherein the illumination light or another light excites the emitter to emit light, wherein a measurement of one or more measured variables is performed, from which the respective current position of the intensity distribution of the illumination light (12) in the sample can be determined, wherein emissions from the emitter are detected, wherein the position of the intensity distribution in the sample fluctuates around a nominal position and in that the measurement is carried out in such a way that the respective current position of the intensity distribution in the sample can be assigned to the detected emissions in each case.

2. The method according to claim 1, wherein the nominal position is a presumed position of the emitter in the sample determined in a previous localization step.

3. The method according to claim 1, wherein the nominal position is a known or predetermined binding site in the sample to which a structure labelled with the emitter is bound or can bind.

4. The method according to claim 1, wherein the fluctuation of the position of the intensity distribution in the sample is caused by at least one movable component of a beam positioning device in a beam path of the illumination light.

5. The method according to claim 4, wherein the fluctuation of the position of the intensity distribution is caused by an inherent jitter of the beam positioning device.

6. The method according to claim 4, wherein the fluctuation of the position of the intensity distribution is caused by a control-based jitter of the beam positioning device.

7. The method according to claim 6, wherein the control-based jitter is conditioned by a specific setting of the control parameters, in particular such that the fluctuation comprises a predetermined variance and/or other predetermined moments and/or that the fluctuation takes place such that current positions are reached which have a predetermined or predeterminable minimum distance from the nominal position.

8. The method according to claim 1, wherein the fluctuation of the position around the nominal position is normally distributed.

9. The method according to claim 1, wherein a random signal is applied to a control input of the beam positioning device.

10. The method according to claim 9, wherein the random signal comprises a predetermined or predeterminable spatial distribution.

11. The method according to claim 10, wherein the spatial distribution is rotationally symmetrical with respect to an axis containing the nominal position, said axis being particularly parallel to an optical axis of an objective of a MINLFUX microscope or a STED-MINFLUX microscope.

12. The method according to claim 10, wherein the spatial distribution comprises a local minimum at the nominal position.

13. The method according to claim 1, wherein the respective current positions of the intensity distribution of the illumination light in the sample are determined from the measured variables and assigned to the detected emissions.

14. The method according to claim 13, wherein a position of the emitter is estimated from the detected emissions and the associated current positions of the intensity distribution.

15. The method according to claim 14, wherein the nominal position is updated after the position of the emitter has been estimated, in particular in that the nominal position is shifted to the estimated position of the emitter.

16. A MINFLUX microscope or STED-MINFLUX microscope for localizing or tracking a singulated emitter in a sample, comprising a light source which is configured to provide an illumination light, an illumination optical system which is configured to expose the sample to an intensity distribution of the illumination light comprising a local intensity minimum in a close region of the singulated emitter, wherein the illumination light is excitation light or emission inhibition light, in particular STED light, and wherein the illumination light or another light excites the emitter to emit light, a microscope control device which is configured to control the MINFLUX microscope or STED-MINFLUX microscope, a beam positioning device which is configured to shift the intensity distribution of the illumination light in the sample, a detection device which is configured to detect emissions from the emitter, wherein the MINFLUX microscope or STED-MINFLUX microscope comprises a measuring device for acquiring measurement data, from which in each case a current position of the intensity distribution of the illumination light in the sample can be determined, wherein the microscope control device is configured to register the respective current position of the intensity distribution of the illumination light in the sample and/or the respective measurement data recorded by the measuring device for a respective detected emission.

17. The MINFLUX microscope or STED-MINFLUX microscope according to claim 16, wherein the measuring device is configured to determine the current position of the intensity distribution of the illumination light in the sample from the acquired measurement data with an uncertainty of at most 10 nm, particularly of at most 5 nm, more particularly of at most 2 nm and most particularly of at most 1 nm.

18. The MINFLUX microscope or STED-MINFLUX microscope according to claim 16, wherein the measuring device is configured to detect an angle or a deflection of a movable optical component of the beam positioning device.

19. The MINFLUX microscope or STED-MINFLUX microscope according to claim 18, wherein the measuring device comprises an integrated angular position measuring system, in particular an integrated encoder, further in particular an integrated rotation encoder, an auxiliary light beam and/or a position-sensitive auxiliary light detector.

20. The MINFLUX microscope or STED-MINFLUX microscope according to claim 16, wherein the MINFLUX microscope or the STED-MINFLUX microscope comprises a signal generator for generating a random signal and in that a control input of the beam positioning device can be supplied with the random signal.

* * * * *